United States Patent Office 2,734,929
Patented Feb. 14, 1956

2,734,929

DEALKYLATION OF HYDROCARBONS

Thomas F. Doumani, Whittier, Calif., assignor to Union Oil Company of California, Los Angeles, Calif., a corporation of California No Drawing. Application June 9, 1952,
Serial No. 292,592

19 Claims. (Cl. 260—672)

This invention relates to new methods for selectively dealkylating hydrocarbons. More particularly it concerns catalytic hydrodealkylation methods whereby the feed stock is treated at high temperatures with hydrogen, or a hydrogen-producing compound, in the presence of a catalyst and a diluent gas in order to selectively split off a desired alkyl group or groups. The process is especially well adapted for removing alkyl groups from aromatic hydrocarbons such as xylene, ethylbenzene and toluene.

The general mechanism of the reaction is well known as follows:

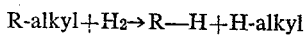

$$R\text{-alkyl} + H_2 \rightarrow R\text{—}H + H\text{-alkyl}$$

However, the known methods for practicing this process are in general not selective for removing any particular alkyl group, and are especially ineffective for removing methyl groups which are attached directly to a benzene ring. Higher alkyl groups may be readily removed, or split down to a methyl group, but the hydrogenolysis of methyl groups, especially the last methyl group, from the benzene ring has always resulted in poor yields of benzene and much destructive hydrogenation resulting in extensive ring rupture. However, the present process is found to give, in the hydrodealkylation of toluene for example, very high yields of benzene, and off-gases consisting almost entirely of methane. At the same time very little carbon is produced.

With the rapid development in recent years of special petroleum refining techniques such as catalytic reforming, hydrogenation, hydroforming, etc., large amounts of alkylated benzenes have become available. These alkylated benzene mixtures may be utilized in motor fuels, but frequently are separated into their components, e. g. toluene, xylenes, ethylbenzene, cumene, mesitylene, etc. for use in the chemical industries as solvents or chemical intermediates. Some of the reforming techniques, e. g., hydroforming with molybdenum containing catalysts, yield very large quantities of such alkylated benzenes in the reformate, but little benzene itself. In many instances, benzene would be a more desirable and valuable product because of its more fundamental utility as a building block in the chemical industries. An economical method for transforming such alkylated benzenes into benzene would therefore be highly desirable. This is particularly true in the case of toluene which is frequently produced in much larger quantities than can be economically utilized, and which is also the most difficult alkaryl hydrocarbon to dealkylate by hydrodealkylation.

It is therefore an object of this invention to provide economical methods for removing certain alkyl groups from organic compounds without at the same time effecting scission of the molecule at other points where such scission is not desired.

A more specific object is to provide economical methods for partially or completely dealkylating alkaryl hydrocarbons by hydrodealkylation without disrupting the aromatic ring structure to any appreciable extent.

A further objective is to achieve the above objects while at the same time obtaining both high yields and high conversions per pass.

A specific object is to produce benzene from toluene in high yields and high conversions per pass.

These and other objects are achieved by the process which is hereinafter more specifically described, and which consists essentially in passing the compound or compounds to be dealkylated in gaseous state at high temperatures, and in admixture with hydrogen or a material which produces hydrogen under the reaction conditions, and a suitable proportion of a gaseous diluent over a bed of contact material capable of promoting hydrogenation. The gaseous diluent is a critical feature of the invention which appears to function in either or both of two manners, viz. (1) to provide an optimum relation between hydrogen partial pressure and total reaction pressure, and (2) to maintain the catalyst in a highly active condition. These hypotheses have, however, not been confirmed to any substantial degree by experimental evidence, and the surprising results achieved must therefore be regarded primarily as empirical phenomena not restricted to any theoretical explanation.

According to another modification of the invention, a small amount of an alkaline material such as sodium hydroxide may be incorporated into the contact material, in addition to any active hydrogenation catalyst which may also be present. The alkaline material is found to further increase the conversions, and/or to permit the use of lower pressures and/or lower ratios of gaseous diluent in the reaction mixture than would preferably be employed if the alkaline material were not present. The alkaline materials employed are preferably the hydroxides of alkali metals, e. g. NaOH, KOH, LiOH, CsOH.

According to still another modification, the activity of the contact material for promoting the desired reactions may be increased by precalcining at higher temperatures than are normally employed for activating such catalysts as alumina, or alumina-silica admixed with other active metals or metal oxides. Normally such catalysts are calcined at temperatures between about 600° F. and 1200° F. for 1 to 6 hours and longer. In the present case, maximum activities for the specific reaction are obtained by calcining the catalyst at temperatures from about 900° F. to 1500° F. for periods of about 1 to 6 hours. This enhanced activity probably results from decreasing the particular surface areas on the catalyst which promote destructive hydrogenation. Essentially the same result may be obtained by maintaining the catalyst on stream in the process for a period of time. Hence the anomalous result is observed that catalysts calcined at low temperatures increase in activity for several hours after being put on stream and especially after repeated regenerations.

The reaction may be carried out in any suitable type of reactor which is adapted for contacting gases with solids at high temperatures. Either continuous or cyclic operation may be desired. In continuous operation, the catalyst in granular, powdered, or pelleted form is contacted countercurrently or concurrently while flowing through the reactor, ordinarily by gravity flow, with a stream of the reactant gases, and product gases are removed near the opposite end of the reactor from the feed inlet. Heat may be supplied by suitable preheating of the contact, or by internal or external heating of the reactor itself, and/or by preheating the feed gases. The contact time and heat supply may be regulated by suitably adjusting the flow rates of catalyst and feed gases. Catalyst removed from the solids outlet end of the reactor is then ordinarily reheated to the reaction temperature and recycled to the solids-inlet end of the reactor. If superatmospheric pressures are employed, suitable pressure seals are provided at the solids inlet and outlet ports.

In cyclic operation a plurality of stationary beds of catalyst are ordinarily employed, whereby some of the units may be maintained on stream at all times while others are undergoing regeneration or cleaning operations. Heat is ordinarily supplied externally or by internal heating elements, and the operation may be conducted at atmospheric pressures or above. Both of the above types of operation are essentially similar in the mechanics of operation to catalytic conversion processes which have heretofore been widely employed for the conversion of various petroleum fractions. Also, in either of the above processes, the catalyst in powdered form may be employed as a fluid suspension in the gases.

The catalysts employed herein comprise as a primary or sole ingredient, an active metal hydrogenation catalyst or compound thereof, which metal may be any of the heavy metals, i. e., those having an atomic weight of 22 or above. A preferred class of metals consists of those belonging to groups VI–B and VIII of the periodic table. These metals are chromium, molybdenum, tungsten, uranium, iron, cobalt, nickel, ruthenium, rhodium, palladium, osmium, iridium and platinum. They are preferably employed in the form of their oxides, but the free metals in finely divided form may be employed, or other compounds thereof such as the sulfides or phosphides, phosphates or sulfates. Molybdenum in the form of molybdic trioxide, either alone or supported on a carrier, is found to be a most highly effective catalyst, especially when promoted with other metals or metal oxides such as cobalt oxide, nickel oxide, iron oxide, and chromia. It is preferable also that the molybdic trioxide in such catalysts should not be chemically combined with any of the added promoters. Thus, a molybdic oxide and cobalt oxide containing catalyst prepared by alternately impregnating with molybdenum and cobalt salts, in such manner that the oxides are not combined, is more active than cobalt molybdate catalysts prepared by coimpregnation or coprecipitation wherein the molybdenum is more or less chemically combined with the cobalt.

An interesting observation regarding the above active metals is that platinum, which is normally the most active metal for hydrogenation and reforming reactions, is among the least active in the present process.

The above metals or their oxides may be employed singly, or in admixture one with another, or they may be deposited on a carrier such as alumina, silica gel, zirconia, thoria, magnesia, titania, montmorillonite clay, bauxite, diatomaceous earth, crushed porcelain, or any other refractory material which has no adverse effect on the reaction. It is preferred to suspend the active catalytic material on such a carrier, and the carriers found to be most effective for this purpose are those made up predominantly of precipitated, gel-type alumina. Such gel aluminas usually have surface areas over 100 sq. meters/gram when measured by gas adsorption. Alumina gels containing between about 1% and 15%, and preferably between about 3% and 8% of coprecipitated silica are especially suitable carriers. The presence of the small amount of silica in the alumina appears to heat-stabilize the resulting catalyst, and prolongs its life as is described in U. S. Patent No. 2,437,532.

In the preferred method for the preparation of catalyst, an impregnation procedure is employed wherein the dried carrier is immersed in an aqueous solution containing a soluble salt of the desired metal, and the impregnated carrier is thereafter separated from the solution, dried and calcined to reduce the impregnated metal salt to an oxide or the free metal.

Prior to the impregnation steps, the carrier is normally shaped into the physical form desired for the catalyst. For this purpose the dried carrier is usually ground, mixed with a lubricant such as graphite and/or hydrogenated vegetable oil, and pilled. In the activation of the carrier by heating the lubricant is removed by combustion. Alternatively the carrier may be used in granular form, or it may be ground into powder, made into a paste and extruded. Where the catalyst is to be employed in a fluidized process, the carrier is formed into a finely divided state as in micro-bead form, or it is ground into a fine state and is thereafter impregnated. In the case of fluidized processes the carrier can be impregnated in larger form, e. g., granules, pills, etc., and thereafter ground to the desired powder size for the processing.

In the preparation of the carrier for impregnation with the metal salt, the heating or activation step to render it sufficiently adsorbent may be effected by heating from two to six hours at 600° F. to 1200° F., for example. Activation temperatures as low as about 300° F. may be employed without difficulty however. The carrier is cooled and is thereafter immersed in the metal salt impregnation solution. Where multiple impregnations are employed, such as where molybdenum and another metal such as cobalt or nickel are used, the carrier may be reactivated by heating to at least about 300° F. and preferably to above about 500° F. between impregnations.

After immersion in the impregnation solution, a part of the impregnation solution is adsorbed by the carrier and the excess solution is thereafter removed. The impregnated carrier, after draining and drying in a low temperature oven such as at 180° F. to 230° F., for example, is finally activated by heating to a temperature of 600° F. to 1500° F. for two to six hours.

If the catalyst is prepared by impregnation of a carrier with an aqueous solution, the concentration of active metal or metals in the impregnation solution will depend upon the particular carrier being employed and upon the desired concentration of active metal in the finished catalyst. In using molybdenum or chromium it is preferred that the catalyst should contain between about 0.4% to 50% of the active metal. For this purpose the impregnation solution may contain between about 2 and 120 grams of metal salts per 100 ml. of solution. The higher concentrations of active metal on the catalyst, for example, above about 30%, are usually, though not necessarily, obtained by multiple impregnation, co-precipitation, or co-pilling.

Although the impregnation methods described above are preferred, other methods may be employed such as coprecipitation, co-pilling, sublimation, etc. For example, a hydrous alumina gel may be mixed with an aqueous solution of chromic nitrate, for example and the mixture dried at 200° F. to 300° F. to obtain a highly active chromia-alumina catalyst. In general any method for preparing active hydrogenation catalysts may be employed herein.

If an alkali metal hydroxide is to be incorporated into the catalyst, this may be done by impregnation at any stage of the catalyst manufacture, or by coprecipitation or co-pilling. Preferably the alkali metal hydroxide is impregnated onto the catalyst after the other active metals have been incorporated. After addition of the alkali metal the catalyst may be prepared for use by drying at 200° F. to 300° F. with or without calcining at temperatures from 600° F. to 1500° F.

In another modification of the invention the catalyst activity may be increased by selectively sulfiding the composite with hydrogen sulfide or other sulfiding agent as described in my co-pending application Serial No. 257,415, filed November 20, 1951.

The materials which may be dealkylated by the process described herein may be aromatic, aliphatic or naphthenic hydro-carbons, or they may contain other functional groups. The materials most readily adaptable to the process are the alkylated aromatic hydrocarbons such as toluene, xylene, ethylbenzene, cumene, trimethylbenzenes, alkylated naphthalenes, alkylated phenanthrenes, alkylated anthracenes, or any mixtures of such compounds. The reaction conditions of the process may be so varied that these materials may be either completely dealkylated or only partially dealkylated. In general, the milder reaction conditions, i. e., low temperatures, low pressures, high space velocities and low mole ratios of hydrogen to hydrocarbon are employed where partial dealkylation is desired, while the more opposite extremes are employed for obtaining complete dealkylation. While the process described herein is not a typical reforming operation in that it does not appear to effect any appreciable isomerization, certain types of petroleum fractions may be benefited by the process for use in motor fuels and the like.

In dealkylating a mixture of the C-8 alkaryl hydrocarbons, including m-xylene, p-xylene and ethylbenzene, it is found that ethylbenzene is most readily dealkylated, meta-xylene next, and para-xylene is least readily dealkylated. This selectivity of dealkylation may be controlled by varying the reaction conditions in such manner as to effect a substantial selective dealkylation of only one or a plurality of components in the mixture, thereby permitting an effective separation of such isomer mixtures by fractional distillation of the reaction mixture.

The process may also be effectively employed for selectively dealkylating aliphatic hydrocarbons. In these cases the scission of the molecule appears to take place preferentially at branching points in the molecular chain. Methyl groups are readily removed from secondary or tertiary carbon atoms. Aliphatic compounds which may be dealkylated include for example 2-methyl pentane, 2,3-dimethyl pentane, 2,2,3,3-tetramethyl butane, 2-methyl hexane.

The material employed herein as diluent may be any substance which exists in the gaseous state under the reaction conditions employed, and which is also stable and non-reactive with the other components of the reaction mixture. Examples of such compounds include water, nitrogen, methane, helium, neon, argon, carbon dioxide, carbon monoxide and mixtures of such materials. It may be economically desirable in some cases to utilize mixtures of waste gases from various other processes such as cracking or hydroforming. Mixtures of hydrogen and methane; hydrogen, water and methane; carbon monoxide and hydrogen, or carbon dioxide and hydrogen may be employed. Any of these diluents, if used in the proper proportions, will substantially increase the liquid yields and theoretical conversions. However, when hydrogen gas is employed as the hydrogenating agent, water vapor is found to be substantially more effective than any of the other materials tested, presumably because of a specific physical or chemical interaction with the catalyst. When the hydrogen for the reaction is generated in situ by dehydrogenation of an organic compound such as a naphthene, it is preferred to employ a diluent other than water, inasmuch as water appears to have a deleterious effect on the dehydrogenation reaction, with the result that there is an insufficient amount of hydrogen generated to effectively hydrodealkylate the feed material. The amount of diluent to be used is measured in terms of molar ratios relative to the feed material; at low total reaction pressures, lower ratios of diluent may be employed, while at high pressures higher ratios are preferred. The operative diluent ratios may range between about 0.5 and 20 moles thereof per mole of feed material. When operating within the preferred pressure ranges from about 150 to 1500 p. s. i. g. it is preferred to use about 1.0 to 5.0 moles of diluent per mole of feed material. The optimum diluent ratio may also depend to some extent upon the specific feed material, the catalyst, the hydrogen partial pressure and the temperature. These factors should be correlated and balanced in each specific case.

The operative reaction conditions may embrace total pressures ranging between 0 and 5,000 pounds per square inch gauge (p. s. i. g.), temperatures between about 800° F. and 1500° F. and contact times, as measured in terms of liquid hourly space velocity (LHSV), between about 0.2 to 10.0 volumes of feed material per volume of catalyst per hour. Pressures above atmospheric are preferred, generally between about 150 and 2000 p. s. i. g., inasmuch as higher conversions are usually obtained than at atmospheric pressure, and also high pressures increase the capacity of the reactor, increasing proportionately the permissible liquid space velocity for a given degree of conversion. High pressures may also assist in preventing dehydrogenation of higher alkyl groups to form olefinic products. The preferred temperature range is between about 900° F. and 1200° F., except that for aliphatic compounds, temperatures between about 800° F. to 1,000° F. are preferable. The most practical space velocities for most of the feed materials range between about 0.5 and 3.0 LHSV. Those skilled in the art will readily appreciate that all of these factors are interrelated, and should be correlated for each specific operation. Thus, low space velocities, high pressures and high temperatures cooperate in the direction of producing more severe and therefore more effective operating conditions, while high space velocities, low pressures, and low temperatures tend to produce opposite results.

If hydrogen gas as such is employed, any amount may be used, ranging from about 0.5 to 10 mols per mol of feed material, depending to some extent upon the number of alkyl groups which it is desired to remove, and also the pressure under which the reaction is carried out. Higher hydrogen ratios will be employed when a higher number of alkyl groups are to be removed and/or when the reaction is conducted at relatively low pressures, and conversely for removing only one alkyl group, or when operating at high pressures, somewhat lower hydrogen ratios may be employed. The preferred range for dealkylating toluene and similar compounds is generally between about 1.0 and 5.0 moles of hydrogen per mole of feed material.

If the hydrogen is derived by dehydrogenation of a hydrogen donor, it is preferred to employ a donor which will dehydrogenate to yield either (1) the same desired compound which is produced by the hydrodealkylation reaction, or (2) a compound which is easily separable from the desired product resulting from the hydrodealklation. In producing benzene from toluene for example, suitable hydrogen donors include cyclohexane, which dehydrogenates to benzene, or alkyl cyclohexanes or alkyl cyclopentanes which may dehydrogenate to produce compounds boiling higher than benzene. Other suitable hydrogen donors include any compounds which will dehydrogenate and still be non-reactive with the compound to be dealkylated.

The process may perhaps be better understood from the following specific examples, which should not, however be considered as in any way limiting the scope of the invention.

EXAMPLE I

An impregnated alumina-silica catalyst containing about 3.0% cobalt oxide, 8.8% molybdenum trioxide, 5.3% silica ($SiO_2$), and the remainder alumina ($Al_2O_3$), was prepared as follows: A co-precipitated alumina-silica gel containing about 6% $SiO_2$ and over 90% $Al_2O_3$ was dried and calcined at about 1100° F. for four hours. The mixture was then formed into ⅛ inch pellets by conventional methods, and the pelleted carrier was soaked for one hour in an aqueous ammoniacal solution of ammonium molybdate containing 25% ammonium paramolybdate, drained, dried at 220 °F. and calcined for 6 hours at 1112° F. The resulting pellates were then soaked for one hour in a 25% aqeuous solution of cobaltous nitrate hexahydrate, drained, dried at 220° F. and again calcined for 6 hours at 1112° F.

Four equal portions of the above catalyst were then employed in four successive runs for hydrodealkylating toluene, with and without a steam diluent. The pressure-reaction vessel in each case was filled with the catalyst pellets and the feed mixture containing vaporized toluene and hydrogen, and steam in the case of run No. 1, was passed downwardly through the catalyst bed, and the reaction products were removed at the opposite end, and condensed. The pressure in all cases was 450 p. s. i. g., and the mole ratio of hydrogen to toluene was essentially the same in all runs (3.8 in run No. 1 and 3.4 in runs 2, 3 and 4). The bed temperature and liquid hourly space velocity of the toluene were varied in runs 3 and 4. The particular conditions and results of the four runs are set forth in the following table:

Table I

| Run No. | Mole ratio, $H_2O/C_7H_8$ | Average Temp., °F. | LHSV $C_7H_8$ | Vol. percent Yield | Mole percent $C_6H_6$ in Product | Mole percent Conversion to $C_6H_6$ per pass |
|---|---|---|---|---|---|---|
| 1 | 5.9 | 1,151 | 1.0 | 95 | 24 | 23.8 |
| 2 | 0.0 | 1,150 | 1.0 | 25 | | |
| 3 | 0.0 | 1,000 | 1.0 | 45 | | |
| 4 | 0.0 | 1,150 | 6.0 | 35 | 6 | 2.1 |

Runs 1 and 2 above show the effects of employing a steam diluent where the reaction conditions are otherwise substantially identical. The yield of 95 volume per cent in run 1 clearly shows that little if any of the toluene was decomposed to gaseous products, while 24 mole per cent of the product was benzene. In run 2, without the diluent, almost 75% of the toluene was converted to gas, mostly methane. Run 3 shows that even reducing the temperature to 1000° F. but employing no diluent, gives only a 45% liquid yield, and substantially less conversion. Run 4 shows that the effect of the diluent cannot be duplicated by increasing the space velocity, since a six-fold increase in LHSV results in only a 10% increase in liquid yield over run No. 2, while the conversion is only 2.1%. All of the above data clearly demonstrates the striking benefits obtainable by employing a diluent in the reaction mixture.

EXAMPLE II

In order to compare the effects of using different ratios of diluent in the reaction mixture, two additional toluene hydrodealkylation runs were carried out with the catalyst of Example I under generally similar reaction conditions. In both runs the temperature was between 1150–1160° F., the pressure was 1000 p. s. i. g., the mole ratio of hydrogen to toluene was about 3.8, and the LHSV of toluene was 1.0. The results obtained were as follows:

Table II

| Run No. | Mole Ratio, $H_2O/C_7H_8$ | Volume Percent Yield | Mole Percent $C_6H_6$ in Product | Mole Percent Conversion to $C_6H_6$ per pass |
|---|---|---|---|---|
| 1 | 3 | 85 | 75 | 72.6 |
| 2 | 5.9 | 91 | 39.5 | 38.5 |

This example shows that optimum results are obtained when the mole ratio of steam to toluene is between about 2 and 5. Also, when the above results are compared with run 1 of Example I, it will be seen that the higher total pressure, 1000 p. s. i. g. as compared to 450 p. s. i. g., approximately triples the conversion to benzene without appreciably increasing the destructive hydrogenation of toluene.

EXAMPLE III

The catalyst of Example I was employed in another toluene hydrodealkylation run employing nitrogen as the diluent. In this example the average bed temperature was 1158° F. and the other reaction conditions were: pressure 1000 p. s. i. g., toluene LHSV 1.0, mole ratio $H_2$ to toluene 3.8, mole ratio $N_2$ to toluene 3.0. A liquid product was obtained which contained 71 mole per cent benzene, and the liquid yield was 57%. This corresponds to a mole per cent conversion to benzene of 45.9%. Both the liquid yield and the conversion were appreciably higher than could be obtained under the same conditions but without a diluent. In this example, a small amount of ammonia was synthesized during the reaction.

EXAMPLE IV

The procedure of Example III was repeated except that an equivalent molar ratio of methane was used as diluent instead of the nitrogen. The liquid yield was 54 volume per cent, the mole per cent benzene in the product was 71, and the conversion to benzene was 43.4 mole per cent.

EXAMPLE V

The catalyst of Example I was further treated by soaking in a 0.3% aqueous sodium hydroxide solution for one hour, then drained and dried at 220° F. The finished catalyst contained, in addition to the components specified in Example I, about 0.1% of NaOH. This catalyst was then employed for toluene hydrodealkylation with a steam diluent under the following reaction conditions, which correspond closely with those of run 2, Example II.

| | |
|---|---|
| Temp. ° F | 1153 |
| Pressure, p. s. i. g | 1000 |
| Mole ratio, $H_2$/toluene | 3.8 |
| Mole ratio, $H_2O$/toluene | 6.0 |
| LHSV, toluene | 1.0 |

The liquid yield was 90 volume per cent, the mole per cent benzene in the product was 49.5%, and the conversion to benzene was 48.5 mole per cent. These results demonstrate a substantial improvement in molar yield and conversion when the catalyst contains a small percentage of alkali metal hydroxide.

EXAMPLE VI

The catalyst of Example I was employed in another hydrodealkylation run using pure ethylbenzene as the feed stock and steam as the diluent. The reaction conditions were as follows:

| | |
|---|---|
| Temp. ° F | 1053 |
| Pressure, p. s. i. g | 1000 |
| Mole ratio, $H_2$/ethylbenzene | 3.8 |
| Mole ratio, $H_2O$/ethylbenzene | 3.0 |
| LHSV ethylbenzene | 1.0 |

The hydrocarbon off-gases consisted about entirely of ethane, indicating that the hydrocracking was very selective. The liquid yield was 79 volume per cent, and the product contained 85 mole per cent benzene and traces of toluene.

EXAMPLE VII

The procedure of Example VI was repeated using a mixed xylene feed material containing about 68% m-xylene, 27% p-xylene and 5% ethylbenzene. The results at 1.0 LHSV showed a liquid yield of 87 volume per cent, and the product consisted of about 10 mole per cent benzene and 60–70 mole per cent toluene. These results show that the alkyl groups in excess of a single methyl group on the benzene ring are much more easily removed than the last methyl group. By increasing the contact time, reaction temperature, hydrogen ratio and/or pressure, the single-pass conversion of polyalkylated benzenes to benzene may be substantially increased. Conversely, by maintaining milder reaction conditions, substantially any desired degree and type of ring-dealkylation may be obtained.

EXAMPLE VIII

In employing a hydrogen donor instead of hydrogen gas, about one mole of toluene is mixed with about 2 moles of cyclohexane and the mixture is vaporized with about 3 moles of methane as diluent gas. The gaseous mixture is then passed over the catalyst of Example I, at about 1000° F., toluene LHSV 1.0, and pressure 450 p. s. i. g. There is a net production of hydrogen during the reaction, and the liquid product is found to contain about 30-40 mole per cent benzene.

EXAMPLE IX

In order to test the effect of various catalysts in the process, nine different catalysts were prepared and employed for hydrodealkylating toluene under the following reaction conditions:

LHSV, toluene _____ 1.0
Mole ratio, $H_2$/toluene _____ 3.4
Pressure, p. s. i. g _____ 30
Average bed temperature, °F _____ 1050-1060

In these runs, no diluent gas was employed, since the purpose was to compare catalyst activities only. The nature of the catalysts, and the results are indicated in the following table:

Table III

| Catalyst | Volume Percent Yield | Mole Percent $C_6H_6$ in Product |
|---|---|---|
| 1. 3% CoO, 8.8% $MoO_3$, 5.3% $SiO_2$ on alumina, by coprecipitating $SiO_2$ and $Al_2O_3$, then impregnating | 91 | 9.5 |
| 2. Same as Catalyst 1, but impregnated with 0.1% NaOH | 90 | 14.3 |
| 3. Same as Catalyst 1, but impregnated with 0.2% NaOH | 90 | 14.3 |
| 4. Same as Catalyst 1, but impregnated with 0.5% NaOH | 93 | 10.7 |
| 5. 3% CoO impregnated on $Al_2O_3$ | 97 | 1.5 |
| 6. 0.5% Pt impregnated on $Al_2O_3$ | 92 | 2.5 |
| 7. 8.7% MoO impregnated on $Al_2O_3$ | 91 | 8.5 |
| 8. Precipitated cobalt-molybdate (No carrier) | 93 | 5.0 |
| 9. 3% cobalt-molybdate on $Al_2O_3$ | 92 | 2.5 |

The above table shows not only the relative effectiveness of the various catalysts, but also that at low pressures, significant dealkylation may be obtained with some of the catalysts, e. g., Nos. 2, 3 and 4 without the addition of extraneous diluents. The unreacted toluene and reaction gases may function as a diluent at low pressures.

EXAMPLE X

A catalyst prepared by impregnating alumina with an aqueous solution of chromic nitrate, and then drying and calcining at 1150° F. for 6 hours is substituted for the catalyst employed in run 1, Example II. The catalyst contains about 10% $Cr_2O_3$. The results are substantially similar to those set forth in table 2, run No. 1.

EXAMPLE XI

The procedure of Example X is repeated except that the temperature is reduced to 1050° F., the pressure to 100 p. s. i. g., and the space velocity to 0.2 LHSV. Substantially the same results are obtained, showing that longer contact times may compensate for lower temperatures and pressures.

EXAMPLE XII

A paraffinic petroleum fraction consisting essentially of 2,2,3,3-tetramethyl butane is subjected to hydrodealkylation over the catalyst employed in Example I using steam as a diluent. The reaction conditions are:

Temperature, °F _____ 1000
Pressure, p. s. i. g _____ 1000
Mole ratio, $H_2$/$C_8H_{18}$ _____ 3.0
Mole ratio, $H_2O$/$C_8H_{18}$ _____ 5.0
LHSV, $C_8H_{18}$ _____ 0.3

The liquid product obtained consists of 2,2,3-trimethyl butane (triptane) in good yields.

From the foregoing it will be seen that the process herein described provides a remarkably effective and efficient means for selectively removing alkyl groups from a wide variety of hydrocarbons, including such difficultly dealkylatable compounds as toluene. This description should not however be considered as limiting, since many variations may be made by those skilled in the art without departing from the scope or spirit of the following claims.

I claim:

1. A process for dealkylating a hydrocarbon containing an alkyl group bonded to a carbon atom which comprises subjecting said hydrocarbon to vapor phase hydrodealkylation at a temperature between about 900° and 1500° F. and a pressure between about 150 and 5000 p. s. i. g., in the presence of (1) between about 0.5 and 10 moles of hydrogen per mole of said hydrocarbon, (2) a hydrogenation catalyst comprising as an essential active ingredient an oxide of a metal selected from groups VIB and VIII of the periodic table, and (3) a substantial initial proportion, over 0.5 mole per mole of said hydrocarbon, of water vapor.

2. A process as defined in claim 1 wherein said catalyst is an intimate mixture comprising a major proportion of an adsorbent oxide carrier, a minor proportion of said oxide of a metal selected from groups VIB and VIII of the periodic table, and a minor proportion of an alkali metal hydroxide.

3. A process as defined in claim 1 wherein said catalyst is an intimate mixture comprising a major proportion of an adsorbent oxide carrier, and a minor proportion of molybdenum oxide.

4. A process as defined in claim 1 wherein said catalyst is an intimate mixture comprising a major proportion of an adsorbent oxide carrier, and a minor proportion of molybdenum oxide plus cobalt oxide.

5. A process for dealkylating an alkyl benzene hydrocarbon which comprises subjecting said hydrocarbon to vapor phase hydrodealkylation at a temperature between about 900° and 1500° F. and a pressure between about 150 and 500 p. s. i. g. in the presence of (1) between about 0.5 and 10 moles of hydrogen per mole of said hydrocarbon, (2) a hydrogenation catalyst comprising as an essential active ingredient an oxide of a metal selected from groups VIB and VIII of the periodic table, and (3) a substantial initial proportion, over 0.5 mole per mole of said hydrocarbon, of water vapor.

6. A process as defined in claim 5 wherein said catalyst is an intimate mixture comprising a major proportion of an adsorbent oxide carrier, a minor proportion of said oxide of a metal selected from groups VIB and VIII of the periodic table, and a minor proportion of an alkali metal hydroxide.

7. A process as defined in claim 5 wherein said catalyst is an intimate mixture comprising a major proportion of an adsorbent oxide carrier, and a minor proportion of molybdenum oxide.

8. A process as defined in claim 5 wherein at least a portion of said hydrogen is formed in situ by concurrent dehydrogenation of a naphthenic hydrocarbon supplied in admixture with said alkyl benzene hydrocarbon.

9. A process for removing a ring-bonded methyl group from a methylated aromatic hydrocarbon with a minimum of ring scission, which comprises subjecting said hydrocarbon to vapor phase hydrodealkylation at a temperature between about 900° and 1500° F. and a pressure between about 150 and 5000 p. s. i. g. in the presence of (1) between about 0.5 and 10 moles of hydrogen per mole of said hydrocarbon, (2) a hydrogenation catalyst comprising as an essential active ingredient an oxide of a metal selected from groups VIB and VIII of the periodic table, and (3) a substantial initial proportion, over 0.5 mole per mole of said hydrocarbon, of water vapor.

10. A process as defined in claim 9 wherein said catalyst is an intimate mixture comprising a major proportion of an adsorbent oxide carrier, a minor proportion of said oxide of a metal selected from groups VIB and VIII of the periodic table, and a minor proportion of an alkali metal hydroxide.

11. A process as defined in claim 9 wherein said catalyst is an intimate mixture comprising a major proportion of an adsorbent oxide carrier, and a minor proportion of molybdenum oxide.

12. A process as defined in claim 9 wherein said catalyst is an intimate mixture comprising a major proportion of an adsorbent oxide carrier, and a minor proportion of molybdenum oxide plus cobalt oxide.

13. A process for producing benzene from toluene which comprises subjecting toluene to vapor phase hydrodealkylation at a temperature between about 900° and 1500° F. and a pressure between about 150 and 5000 p. s. i. g., in the presence of (1) between about 0.5 and 10 moles of hydrogen per mole of toluene, (2) a hydrogenation catalyst comprising as an essential active ingredient an oxide of a metal selected from groups VIB and VIII of the period table, and (3) a substantial initial proportion, over 0.5 mole per mole of toluene, of water vapor, and recovering benzene from the reaction product.

14. A process as defined in claim 13 wherein said catalyst is an intimate mixture comprising a major proportion of an adsorbent oxide carrier, a minor proportion of said oxide of a metal selected from groups VIB and VIII of the periodic table, and a minor proportion of an alkali metal hydroxide.

15. A process as defined in claim 13 wherein said catalyst is an intimate mixture comprising a major proportion of an adsorbent oxide carrier, and a minor proportion of molybdenum oxide.

16. A process as defined in claim 13 wherein said catalyst is an intimate mixture comprising a major proportion of an adsorbent oxide carrier, and a minor proportion of molybdenum oxide plus cobalt oxide.

17. A process for selectively removing a terminal methyl group from a branched-chain paraffin hydrocarbon which comprises subjecting said hydrocarbon to vapor phase hydrodealkylation at a temperature between about 900° and 1500° F. and a pressure between about 150 and 5000 p. s. i. g. in the presence of (1) between about 0.5 and 10 moles of hydrogen per mole of said hydrocarbon, (2) a hydrogenation catalyst comprising as an essential active ingredient an oxide of a metal selected from groups VIB and VIII of the periodic table, and (3) a substantial initial proportion, over 0.5 mole per mole of said hydrocarbon, of water vapor.

18. A process as defined in claim 17 wherein said catalyst is an intimate mixture comprising a major proportion of an adsorbent oxide carrier, and a minor proportion of molybdenum oxide.

19. A process as defined in claim 17 wherein said catalyst is an intimate mixture comprising a major proportion of an adsorbent oxide carrier, and a minor proportion of molybdenum oxide plus cobalt oxide.

References Cited in the file of this patent

UNITED STATES PATENTS

| | | |
|---|---|---|
| 2,383,072 | Oblad | Aug. 21, 1945 |
| 2,396,761 | Tilton | Mar. 19, 1946 |
| 2,436,923 | Haensel | Mar. 2, 1948 |
| 2,438,570 | Mattox | Mar. 30, 1948 |
| 2,632,779 | Pfennig | Mar. 24, 1953 |

FOREIGN PATENTS

| | | |
|---|---|---|
| 127,690 | Switzerland | Sept. 1, 1928 |

OTHER REFERENCES

Ipatieff: Jour. Am. Chem. Soc., vol. 55, pages 3696–3701 (6 pages).